Jan. 26, 1926.  
P. D. PARSONS  
1,570,918  
CONVEYER AND PACKAGE LABELING MACHINE  
Filed Sept. 18, 1924  3 Sheets-Sheet 1
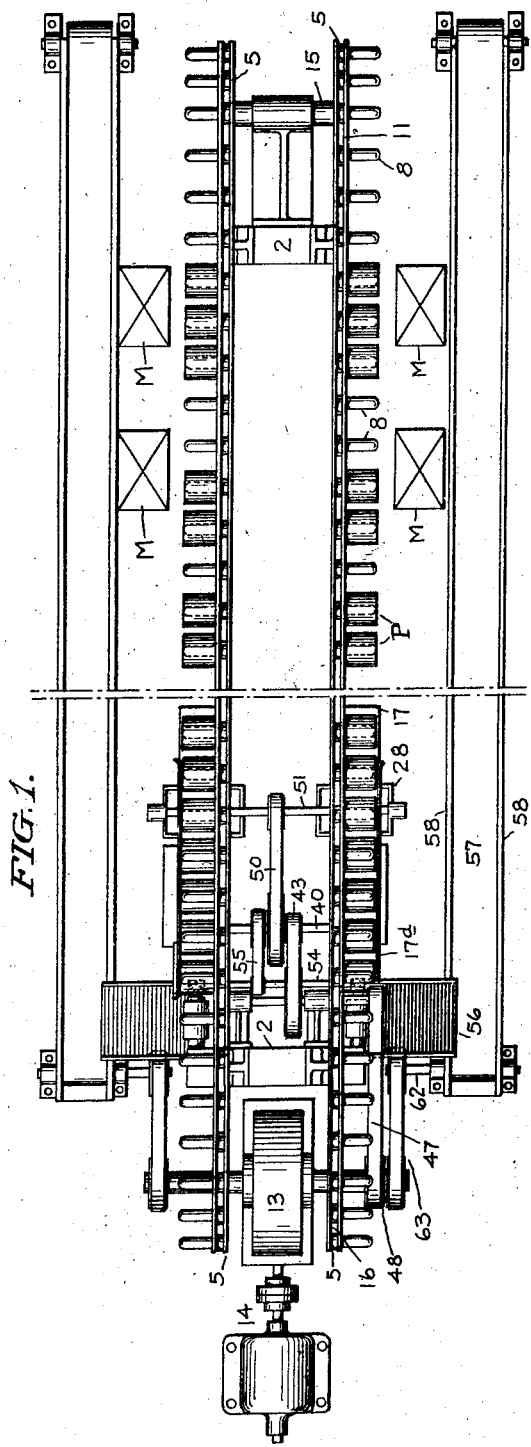
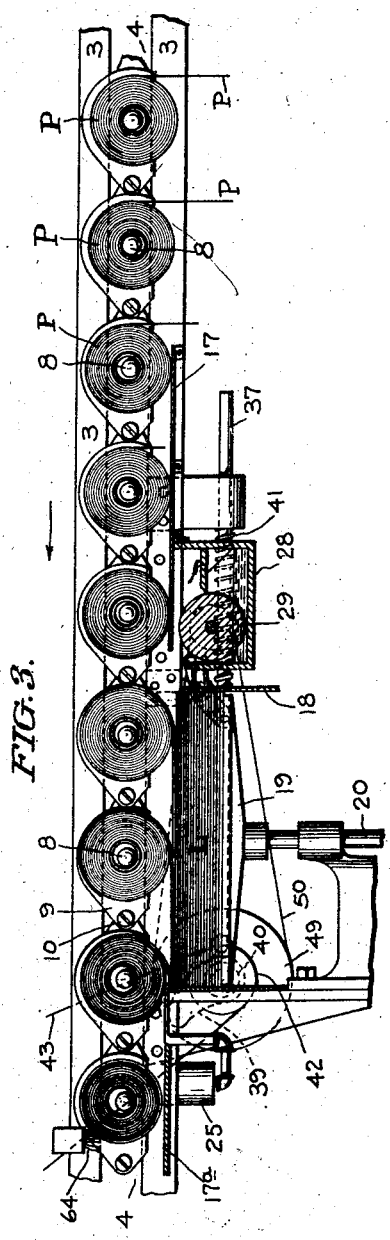
INVENTOR.  
Philip D. Parsons.  
BY  
ATTORNEY

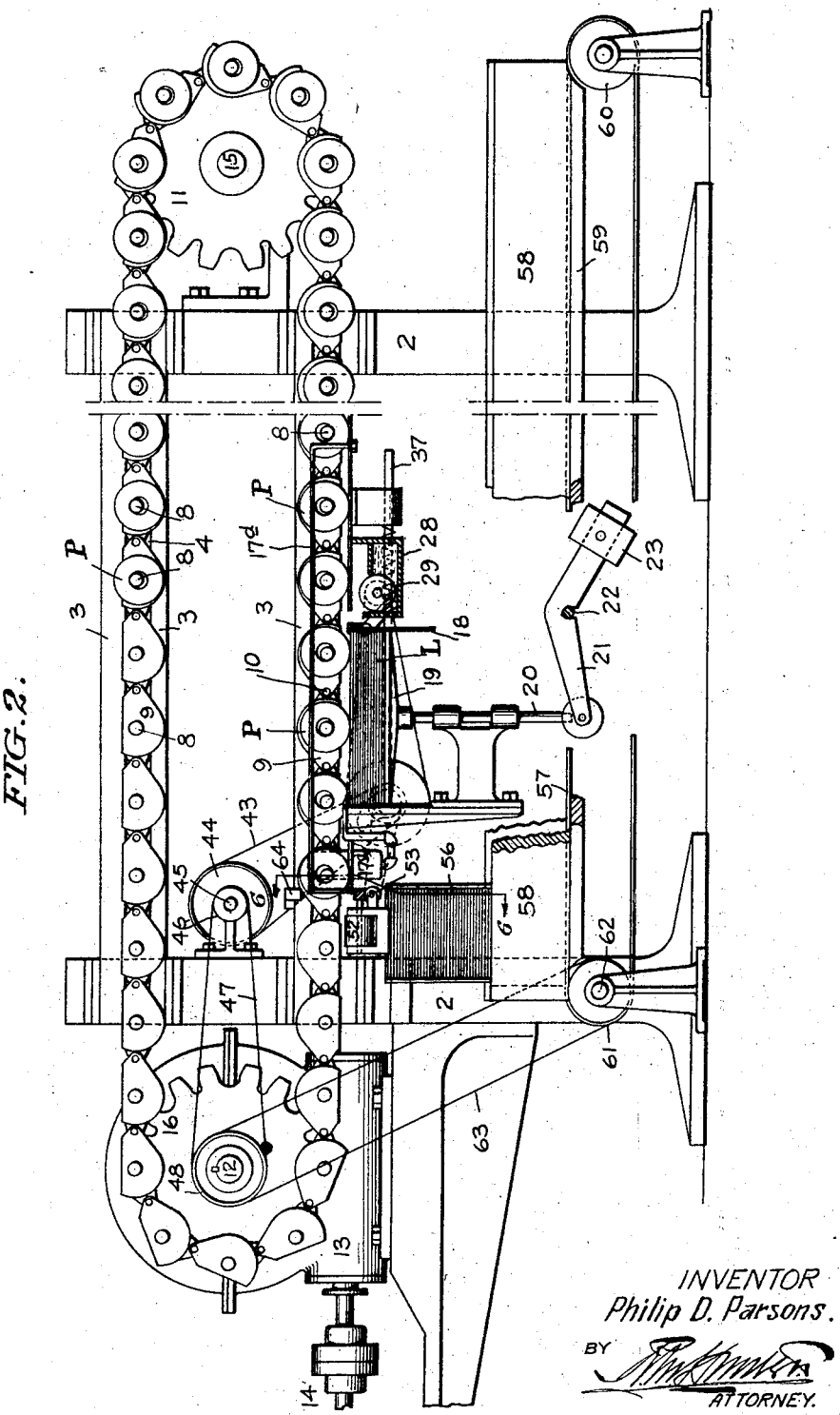

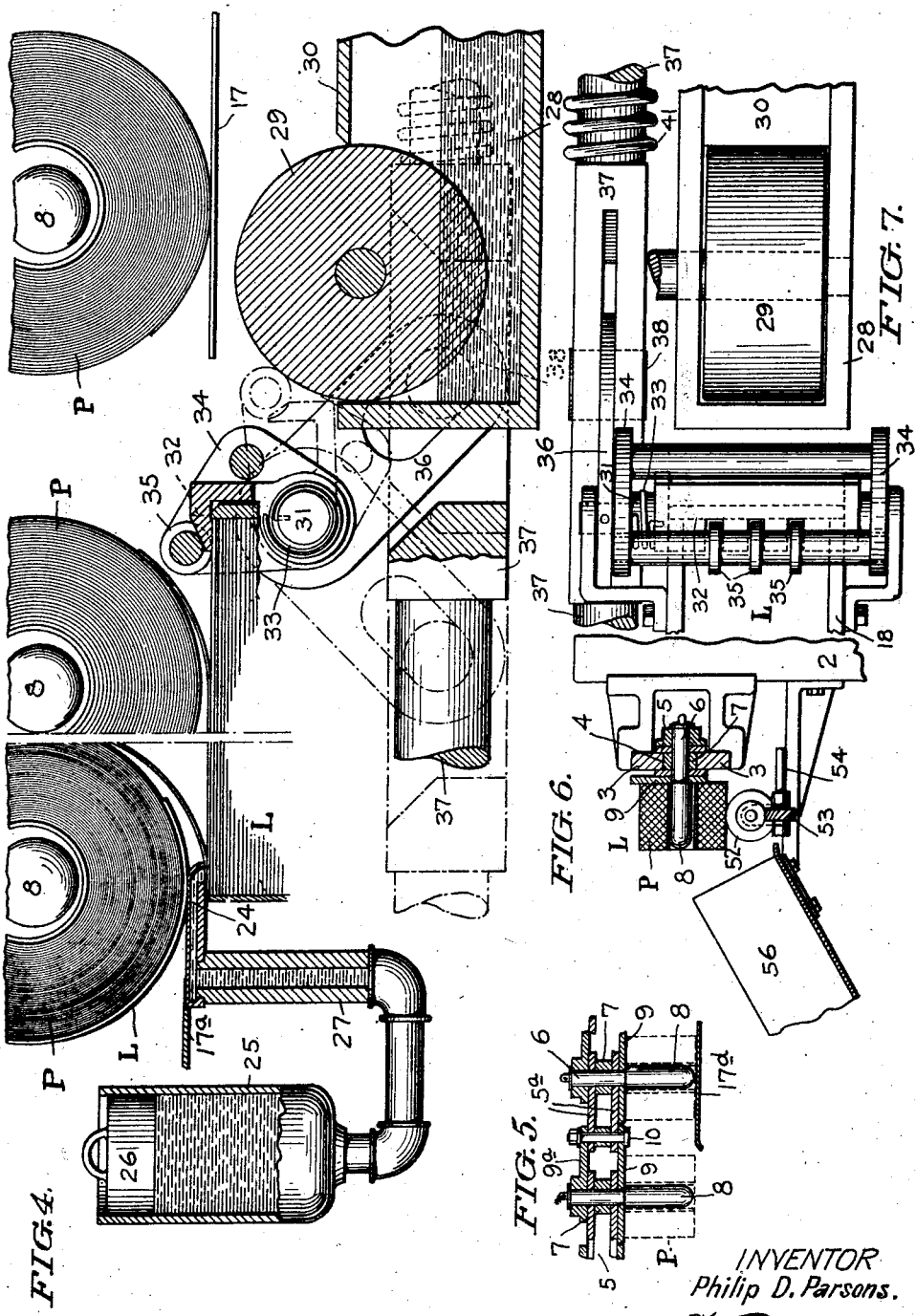

Patented Jan. 26, 1926.

1,570,918

UNITED STATES PATENT OFFICE.

PHILIP D. PARSONS, OF PHILADELPHIA, PENNSYLVANIA, ASSIGNOR TO SCOTT PAPER COMPANY, A CORPORATION OF PENNSYLVANIA.

CONVEYER AND PACKAGE-LABELING MACHINE.

Application filed September 18, 1924. Serial No. 738,364.

*To all whom it may concern:*

Be it known that I, PHILIP D. PARSONS, a citizen of the United States, and resident of Philadelphia, county of Philadelphia, and State of Pennsylvania, have invented an Improvement in Conveyer and Package-Labeling Machines, of which the following is a specification.

The object of the present invention is two-fold, namely: to label or band packages and to convey such packages from their places of production to the label or band applying devices, enabling the product of a plurality of package producing machines being conveyed to a single mechanism for automatically applying the labels or bands, whereby this work may be accomplished in a speedy manner, with saving in labor and handling compared with former methods, and with a considerable lessening in cost.

In general, the nature of the improvements may be broadly defined as embodying a long traveling conveyer having carrying means for packages usually in roll form, said conveyer moving past any desired number of package producing machines whose operators apply their product to the conveyer as it moves by, said conveyer in operative association and combination with label or band applying devices which automatically applies the said labels or bands about the packages during and by reason of the moving or rolling action of the packages over the labels or bands and paste applying means, the completed packages being thereafter discharged from the conveyer, the entire operation from the applying of the packages to the conveyer to the complete labeling or banding being performed without any handling of the packages by workmen.

More specifically, the apparatus comprises a conveyer having lateral pins upon which rolls of toilet paper in package form are loosely hung and by which said paper rolls may be conveyed over any desired distances, said conveyer moving over paste and label applying means suitably located and of such character that the rolls are automatically rolled over and in contact with the paste applying means and labels whereby they each successively pick up the forward end of a label, wrap itself within the label and secure same in position as an enclosing band, the labeled or banded rolls thus provided being discharged from the conveyer pins by means which move the rolls in succession endwise from the pins and for delivering them to a place of reception while the conveyer continues its travel with unloaded pins past the package producing machines where they are again loaded with new paper rolls to be labeled or banded.

My invention further comprises details of construction which, with the features above stated, are fully described hereinafter and more particularly defined in the claims.

Referring to the drawings: Fig. 1 is a plan view with a part of the upper portion removed showing a conveyer and labeling machine embodying my improvements; Fig. 2 is a side elevation of the same with portions broken away; Fig. 3 is a side elevation, with portions in section, showing a part of the machine more particularly in respect to applying the labels to the packages; Fig. 4 is an elevation with part in section showing means for applying paste to the label and package; Fig. 5 is a horizontal sectional view of the conveyer and guide plate for the paper rolls to position them upon the pins; Fig. 6 is a transverse vertical section on line 6—6 of Fig. 2 showing the discharging means for the labeled packages; and Fig. 7 is a plan view of the label applying devices shown at the right hand portion of Fig. 4.

2 are upright frames extending from the floor and connected at opposite sides by four longitudinal guide bars 3 arranged in pairs and one above the other to form guideways 4. Separate conveyer devices 5 are arranged at each side of the machine and guided by the guideways 4, but as these are merely duplicates to give increased capacity to the machine, it will suffice to describe the mechanism in detail which pertains to one of the conveyers only. The conveyer 5 is of a link belt variety, being composed of parallel inner links $5^a$ and parallel outer links 9 and $9^a$, said links coupled in series by transverse hinge bolts 10 and parts 6 of the pins 8. Journaled on the parts 6 of the pins are rollers 7 which may also act as spacing means for the links $5^a$ (Fig. 5). These rollers 7 travel through the guideways 4 aforesaid, and the links 9 and $9^a$ are made of large area so as to extend partly over the outer and inner faces of the bars 3 and thereby insure the conveyers 5 traveling properly along the guideways. This link conveyer is endless and is guided at one end over a sprocket wheel 61 by which it receives motion and at the other end over a sprocket wheel idler 11 having a shaft 15. The driving sprocket wheel 10 is secured to a shaft 12 and may be driven in any convenient manner, such, for example, as a worm and worm-wheel drive 13 operated by power devices 14 including, if desired, an electric motor. The conveyer 5 may be made in any other convenient manner and I do not confine myself to the details shown except as to it being provided with lateral projections or pins 8 or other equivalent package carrying means.

In Fig. 2, the conveyer is shown more particularly in connection with label or band applying means, but it is broken across to indicate that it may have any length required. In Fig. 1, I have shown the machine on a smaller scale and extended to the right so as to be within reaching distance of the operators at roll winding machines indicated at M and whose products are to be placed upon the pins 8 of the conveyer and thereby be conveyed to the label applying device whereat the labels are automatically placed about the rolls so that they are banded against unwinding during transportation and sale in the commercial market.

The paper rolls P may be of any ordinary construction, being usually wound upon a soft cardboard core having a diameter suitable for receiving a dispensing holder. The apertures through the rolls are considerably larger than the diameter of the pins 8 of the conveyer, so that when they are placed on the pins, as they travel past the roll making machines M, the rolls hang loosely with freedom to being rotated. If the conveyer passes a plurality of roll making machines M, the operators place the rolls upon any unoccupied pins, no care in this respect being required. The capacity of the conveyer to handle rolls is dependent upon its speed, consistent with the operativeness of the label applying devices; and, therefore, if its speed represented the passage of sixty pins per minute, it is manifest that it could only receive that number of rolls from the roll winding machines, and if, for example, the roll winding machines had a capacity of ten rolls per minute, the conveyer would take care of the product of six machines. By making the conveyer machine double, as shown, its capacity is of course doubled without taking up appreciably greater space.

While I have shown certain features of construction in respect to the label applying devices and which will now be described, I do not restrict myself thereto except so far as the paper rolls P are automatically caused to roll over the labels and thereby wrap themselves in the labels and cause the same to be properly pasted in position.

The label applying devices are best shown in Figs. 2, 3, 4 and 7. The face plates provided by the conveyer links 9 are somewhat greater than the diameter of the paper rolls P, so that they may be definitely positioned on the conveyer by being pressed against said plates, this being done by the horizontal guide rod 37ᵈ (Figs. 2 and 5), at the time the labels are being applied. Assuming that the conveyer and paper rolls P are moving in the direction of the arrow in Fig. 3, the rolls hanging on the pins 8 will be caused to run upon and along the shelf 17 and be thereby caused to rotate by friction therewith, this insuring any loose or overhanging paper ends p being wound up on the roll before being labeled.

18 is a label container, in which the labels L are stacked horizontally and pressed upward by a plate 19 attached to the upper end of an adjustable rod 20, said rod being pressed upward by a lever 21 fulcrumed at 22 and counterweighted at 23. As the labels are moved upward, the forward end of the uppermost label is retained by the hold-down 32 which is loosely sleeved on a rock shaft 31 and connected with it by a coiled spring 33, and the rearward end is retained by being pressed upward against a paste applying spreader outlet 24. As each upper label is removed the next assumes the retained position awaiting the action of the next paper roll P. The paste applying spreader 24 receives paste through passage 27 from a reservoir 25 from which the paste is forced under the pressure of the weighted piston 26. In this manner, the paste is applied to the upper surface of the label before the roll passes over it. In Fig. 4, the roll P is wrapped with a label L and is just about pulling the rearward pasted end of the label from under the paste applying spreader 24. Before the roll P passes over the forward end of the label L, glue must be applied thereto to enable the roll as it rolls over the label to stick to it and cause the label end to be lifted and the label to be wrapped about the roll. In Fig. 3, it will be seen that three rolls are in the act of applying labels to themselves as they roll along, the positions of the forward and rearward rolls in relation to the labels being similar to what is shown in Fig. 4. The means for applying the glue to the forward end of the label comprises a glue box 28 in which a roller 29 continually rotates, the excess of glue being scraped off its surface by a scraper 30. The glue is transferred from the roller 29 to the upper forward surface of the labels L by rollers 35 which are moved with a reciprocation movement about the axis of the shaft 31. As shown in Figs. 4 and 7, these paste applying rollers 35 are spaced apart and are carried by a frame 34 secured to the rock shaft 31, the same being rocked by a slotted arm 36 engaged by a pin 38 in a reciprocating rod 37 which latter is moved in one direction by a cam 39 when the rollers apply glue to the labels and in the other direction by spring 41. In this operation, the cam 39 makes a revolution with the passage of each pin 8 and its paper roll P. Motion is imparted to the cam from driving shaft 12 by the following chain and sprocket wheel transmission: Wheel 48, chain 47, wheel 46 on shaft 45, wheel 44 also on said shaft, chain 43, wheel 42, and cam shaft 40. The glue supplying roller 29 is rotated in the glue box by a sprocket wheel and chain drive 49—50 and shaft 51. Any other suitable means may be employed, if so desired.

In Fig. 3, I have shown the glue applying means in the act of supplying glue to the rollers 35 while in Figs. 4 and 7, the parts are in the other extreme position as in applying glue to the label end. The cam 39 operates during approximately a quarter of its revolution in moving the rollers 35 from the glue supplying roller 29 (Fig. 3) to the labels L (Fig. 4) and is shaped to permit a quick return and also a rest during approximately one-half the revolution of cam 39. I, however, do not restrict myself in these respects, as all that is essential is to insure glue being applied to the labels with the passing of each roll P irrespective of how it may be applied.

Referring again to Figs. 4 and 7, with reference to the particular construction of the hold-down 32 and glue applying rollers 35 and their connecting mechanism, it will be seen that the positions of the parts when applying glue to the labels are shown in solid lines and when receiving glue from the glue supplying roller 29, in dotted lines. The frame 34 and rollers 35 together with the hold-down are positively moved under the control of cam 39 (Fig. 3), but the hold-down 32 has an additional relative movement on shaft 31 caused by the spring 33. This insures the hold-down assuming the position shown in Fig. 4 to hold down the forward end of the labels before the rollers 35 apply the glue thereto; and in the reverse movements, permits the rollers 35 to be moved slightly away from the labels while the spring 33 temporarily holds the hold-down in operative position to prevent the label sticking to the rollers 35 as they rise. Thereafter, both the rollers and hold-down move together to the other extreme position (Fig. 3). The hold-down 32 is the first to act upon the labels and last to leave them, this being due to the use of the spring 33 and the looseness of the hold-down on shaft 31. To enable the rollers 35 to apply glue to the label, the hold-down is notched (Fig. 7) so as to permit the rollers to pass through these notches to reach the label.

In respect to this glue applying means, it is pointed out that they are intermittent in action and timed with the passage of the pins 8 and rolls thereon and the application of glue permits a rolling motion of the roll P to cooperate with the label through the presence of glue to pick up the label end and wrap the same about itself. This action would be broadly the same whether the glue is applied to the label L or to the roll P, since it is, in any event, applied to the articles to be united, and all that is necessary is to insure its application in a manner which insures the forward end of the label being united to the revolving roll during its advancement.

In respect to the paste applying spreader cooperating with the rear end of the label, I have shown, by way of example, a means for securing the results required, but any other suitable means to applying paste to the upper surface of the rear end of the invented label may be employed in lieu of the means shown, without being a departure from the invention in its broader aspect.

When the rolls have been banded or labeled, they roll over the table or shelf 17$^a$ to the rear of the label applying devices and in so doing the pasted seam is moved under the brush device 64 which smooths down the seam and more fully insures the same being a perfect one.

The next and final operation is to automatically discharge the labeled rolls from the machine and this is done by the following means: At the rear end of the table or shelf 17$^a$ I provide a continually rotating ejecting roller 52 having its horizontal axis at right angles to the pins 8, said roller being so positioned that the paper rolls P rest in succession upon it as they are carried along by the pins of the conveyer. The friction of the ejecting roller 52 upon the bottom of the paper roll P causes the latter to be thrown off upon the pin 8 into a chute 56, down which it passes to a suitable conveyer 57 moving between side guide boards 58 (Figs. 1 and 2) and by which the labeled rolls or packages are delivered to the packer for assemblage in a shipping carton. The ejecting roller 52 is rotated by spiral gears 53, in turn driven by shaft 54 and sprocket and chain means 55 from shaft 40 before referred to. The discharging conveyer 57 is driven from the main drive shaft 12 by sprocket chain or belt 63 and wheel or pulley 61 on shaft 62 of the conveyer.

It will be evident that there is no handling by attendants of the rolls from the time they are placed on the pins 8 of the conveyer to the time the labeled rolls are delivered to the packer, and consequently the cost for labor is reduced to a minimum. It will also be seen that the operation of banding the rolls is automatic and rapid and therefore efficient. It is also to be noted that as all rolls are labeled under precisely the same conditions they are all alike and as perfect in form and appearance as is consistently possible to be secured by an automatic machine.

While I have described my invention more particularly in applying labels to the rolls, it is to be understood that the invention is equally applicable to applying bands having no printed matter on them, therefore when I refer to labels or to bands, they are to be taken as synonyms so far as the invention is concerned.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. A machine of the character stated, comprising an endless conveyer having lateral pins at intervals along its length adapted for carrying in suspension rolls of paper to be labeled with encircling bands, combined with means for applying said bands consisting of devices for causing the paper rolls to rotate upon the pins of the conveyer, magazine means for feeding the bands or labels into position for the rolls to roll over them, and means for supplying adhesive material whereby the rolls when rolling over the bands or labels are caused to pick up and wrap the same about themselves in succession.

2. The invention according to claim 1, wherein further, automatic means are provided for discharging the banded rolls in succession from the conveyer pins.

3. The invention according to claim 1, wherein further, means are provided for pressing the rolls endwise on the pins of the conveyer to insure the bands all being symmetrically applied to the paper rolls.

4. The invention according to claim 1, wherein further, a shelf is provided below the pins of the conveyer for supporting the paper rolls and creating a friction therewith whereby the rolls are caused to rotate before reaching the band applying means so as to wind up any loose ends preliminary to the banding.

5. The invention according to claim 1, wherein further, the adhesive applying means includes devices at the rear end of the band feeding means for spreading paste across the rear end of the band.

6. The invention according to claim 1, wherein further, the adhesive applying means includes devices at the rear end of the band feeding means for spreading paste across the rear end of the band, said devices extending over the end of the bands whereby said bands are held down until the same is pulled from under the means for applying and spreading the paste.

7. The invention according to claim 1, wherein further, the machine is provided with a main frame having horizontal guideways for the conveyer, and guiding means are arranged at each end of the main frame for guiding the conveyer, and wherein also the conveyer is made greatly longer than the space occupied by the band or label applying means whereby it may extend past one or more roll producing machines at a distance and from which the rolls are supplied to the pins of the conveyer.

8. The invention according to claim 1, wherein further, the pins on the conveyer are spaced apart a greatly less distance than the length of the band or label whereby a plurality of paper rolls may at one time be rolling over the magazine for the bands or labels when causing themselves to be banded.

9. The invention according to claim 1, wherein further, means are provided for holding down the forward ends of the bands or labels preliminary to the application of the glue for causing the band to be picked up by the advancing revolving paper roll.

10. The invention according to claim 1, wherein further, the conveyer is provided with a large flat surface about each of the pins and against which the rolls are pressed, and longitudinal means are provided for pressing the rolls against the said flat surfaces of the conveyer while they are being fed forward by the pins of the conveyer.

11. The invention according to claim 1, wherein further, means are provided for giving to the rolls suspended on the pins of the conveyer a rotary movement to wind up any loose or hanging ends previous to said rolls reaching the band applying means.

12. The invention according to claim 1, wherein further, the means for applying adhesive for enabling the paper rolls to pick up the forward ends of the bands includes roller means rotating in a glue box and positive means operating commensurately with the speed of the conveyer for rotating the roller means.

13. The invention according to claim 1, wherein further, the means for insuring the application of adhesive for attaching the bands to the paper rolls comprises a plurality of glue applying roller surfaces whereby the forward ends of the bands are picked up by the paper rolls and also comprise a paste applying device extending transversely across the band feeding means for applying paste entirely across the bands at their rear ends for sealing the bands upon themselves when fully wrapped about the paper rolls.

14. In a machine of the character stated, the combination of an endless chain conveyer having laterally extending package supporting means along its length upon which the packages are loosely hung and for sustaining and spacing the packages at intervals apart, stationary means for causing the packages to rotate upon the supporting means while in the custody of the conveyer, a band magazine across which the packages are conveyed and rotated, and means for applying adhesive whereby the rotating packages are caused to be attached to the bands and wrapped therein and the overlapping ends of the bands pasted together.

15. In a machine of the character stated, the combination of an endless conveyer having package supporting means along its length for spacing the packages at intervals apart, means for causing the package to rotate while in the custody of the conveyer, a band magazine across which the packages are conveyed while rotating, and means for applying adhesive whereby the rotating packages are caused to be attached to the bands and wrapped therein and the overlapping ends of the bands pasted together, and wherein further, means are provided for automatically ejecting the banded packages in succession laterally in respect to the direction of travel of the conveyer.

16. The invention according to claim 14, wherein further, the means for applying adhesive comprises two separate devices one for applying glue to the package arranged in advance of the forward end of the band magazine and the other for applying paste directly to the rear end of the band while in the magazine arranged at the rear end of the band magazine, whereby each package first picks up the forward end of a band and wraps itself therein and finally the overlapping ends of the band are pasted together to maintain the band in position.

17. The invention according to claim 14, wherein further, yielding means are provided for definitely positioning the packages transversely with respect to the band magazine whereby the bands are properly positioned upon the packages.

In testimony of which invention, I hereunto set my hand.

PHILIP D. PARSONS.